July 24, 1956  R. C. FUSON ET AL  2,756,245
PREPARATION OF CACODYL AND CACODYL OXIDE
Filed March 13, 1943
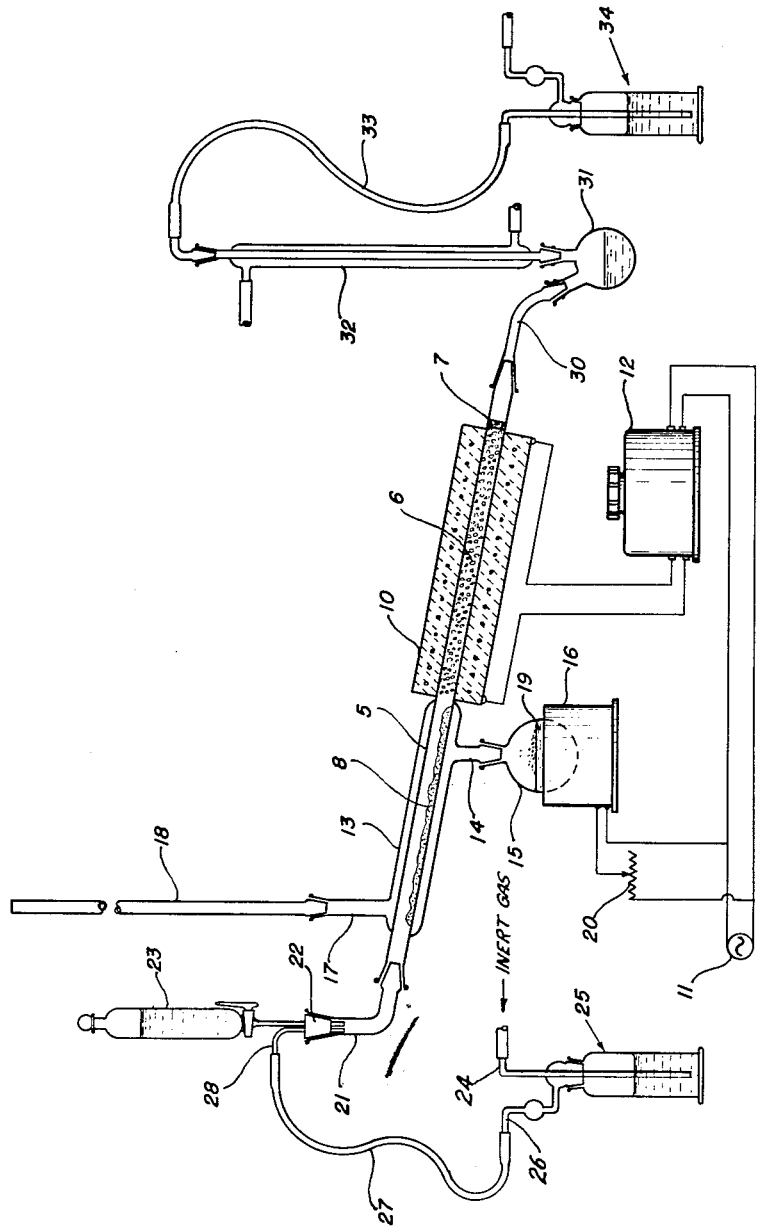
INVENTORS
REYNOLD C. FUSON,
WILLIAM SHIVE United States Patent Office 2,756,245
Patented July 24, 1956

2,756,245

PREPARATION OF CACODYL AND CACODYL OXIDE

Reynold C. Fuson, Urbana, Ill., and William Shive, New Orleans, La., assignors to the United States of America as represented by the Secretary of War Application March 13, 1943, Serial No. 479,070

13 Claims. (Cl. 260—440)

The invention described herein may be manufactured and used by or for the Government for governmental purposes without the payment to us of any royalty thereon.

This invention relates generally to a catalytic process of making cacodyl oxide and cacodyl, and the homologues or alkyl derivatives of these arsenical compounds.

Heretofore, cacodyl oxide and cacodyl have only been made by small scale, batch methods. In fact, the original process of making cacodyl oxide and cacodyl, discovered by Cadet in 1760, and consisting of pyrolyzing a mixture of equal parts by weight of arsenic trioxide and potassium acetate, is essentially the standard process used at the present time, with only minor improvements having been made therein. The product resulting from Cadet's reaction is known as "Cadet's liquid," and consists of an inflammable mixture of cacodyl oxide and cacodyl, the cacodyl oxide being present in the larger amount.

In making cacodyl from Cadet's liquid, the mixture is usually treated with concentrated hydrochloric acid and ferric chloride or mercuric chloride, followed by steam distillation so as to produce cacodyl chloride. The cacodyl chloride may be reduced with zinc to form cacodyl. Cacodyl chloride is the intermediate from which a great many organic arsenical compounds and therapeutic agents are made. The "yield" of the Cadet reaction is usually reported as the percentage of cacodyl chloride formed, based on the amount of arsenic trioxide used.

The batch process of Cadet and the modifications thereof, are objectionable for several reasons, and become increasingly so when it is necessary to make cacodyl on a quantity production basis. Among the more objectionable features and disadvantages of the Cadet process are the facts that: it is a "batch" process and has all the disadvantages of a batch process as compared with a continuous process; the yield is low, a 17% yield of cacodyl chloride on the basis of arsenic trioxide being maximum; and, the problem of disposing of the toxic arsenical residue formed is a serious nuisance.

The above objections to and disadvantages of the Cadet process have long been fully understood by those skilled in the art, but to date, insofar as is known, there has been no substantial improvement therein.

Accordingly, the object of this invention, generally stated, is the provision of an improved process of making cacodyl oxide and cacodyl which has the following advantages:

a. A high yield of from 66 to 77 percent of cacodyl chloride is obtainable, based on arsenic trioxide, and even higher yields appear to be possible.

b. The process is semi-continuous and adapted to efficient large scale production.

c. There is no arsenical residue formed, and therefore no problem of disposing of waste arsenicals.

d. Acetic acid and other reactants may be used which are less expensive than the potassium acetate used in the Cadet process.

Other objects and advantages of the invention will, in part, be obvious and will, in part, appear hereinafter.

Briefly stated, the invention provides a catalytic process of making cacodyl oxide and/or cacodyl, and the homologues thereof, which comprises passing the vapors of arsenic trioxide and the organic acid or acid anhydride corresponding to the desired alkyl group to be attached to the arsenic, over a heated catalyst comprising an alkali metal salt or hydroxide which will react with the organic acid or anhydride to form the alkali metal salt thereof. The alkali metal salt of the organic acid or anhydride may also be used as the catalyst.

For a more complete understanding of the nature and scope of this invention, reference may be had to the following detailed description thereof, setting forth by way of illustration certain specific procedures and reactants, taken in connection with the accompanying drawing in which the single figure shows one form of apparatus in which the invention may be practiced.

Referring to the drawing for a detailed description of the apparatus, the reference character 5 designates a slanting Pyrex tube which serves as a reaction chamber. Approximately the lower half of the length of the tube is filled with a catalyst 6 in granular or subdivided form and held in place by a porous asbestos plug 7. Arsenic trioxide is distributed in the upper half of the reaction tube 5, as indicated at 8.

It is necessary, in order for the reaction to proceed, that the catalyst 6 be heated. Accordingly, an electrical heating unit 10 is disposed around the lower half of the tube 5 in heat conductive relationship with the catalyst body 6, as shown. The heater 10 is connected for energization in electrical circuit relationship with a source of alternating current indicated at 11. A variable transformer 12 is connected in series circuit relation between the source of current 11 and the heater 10. The heat output and temperature of the heater 10 may be regulated by the variable transformer 12, as desired.

In order to sublime the deposit of arsenic trioxide 8 at a uniform and constant rate, a heating jacket 13 is sealed around the upper half of the tube 5, as shown. The jacket 13 is provided with an inlet connection 14 on the under side thereof which connects with a flask or boiler 15 setting in an electrical heater unit 16. The heating jacket 13 is also provided at its upper end with an outlet connection 17 in which an air condenser 18 is supported. The heater unit 16 is electrically connected for energization with the source of current 11, as shown. An adjustable rheostat 20 is connected in series circuit relationship with the heater 16 so that the temperature thereof may be regulated as desired.

The flask 15 is filled with a liquid 19, such as diphenyl ether or diethyl phthalate, which boil at 259° C. and 296° C., respectively. Other liquids having suitable boiling points may also be used in the boiler 15. The vapors of the liquid 19 generated in the boiler 15 pass through the jacket 13 and are continuously condensed in the air condenser 18. These hot vapors surrounding the tube 5 serve to sublime or vaporize the arsenic trioxide, which sublimes at 193° C. at a uniform rate when the vapors are continuously removed so that partial pressure of arsenic trioxide will not prevent continued sublimation at this temperature.

An adapter tube 21 is fitted into the upper end of the tube 5 and is provided with a two-hole stopper 22. The outlet stem of a dropping funnel 23 is fitted into one hole of the stopper 22 so as to provide for the admission into the tube 5, at a uniform rate, of the desired organic acid or anhydride. In order to sweep or carry the reacting vapors through the tube 5 provision is made for connecting the tube 5 with a stream of inert gas, such as carbon dioxide or nitrogen. A source of inert gas is connected with the inlet connection 24 of a sulfuric acid wash 25, and the outlet connection 26 of the wash 25 is connected by means of a hose 27, with an angle tube 28 fitting in the second hole of the stopper 22.

The lower outlet end of the reaction tube 5 is connected by means of an adaptor 30 to one neck of a two-neck receiving flash 31, as shown. The other neck of the flask 31 is provided with a reflux condenser 32, the outlet of which is connected by a hose 33 with a water wash 34. The water wash 34 should be disposed in a ventilated hood or other well ventilated place so that vapors issuing therefrom will be removed from the apparatus.

It will be understood that certain other forms and modifications of apparatus may be used to carry out the invention. When the catalytic reaction is carried on on a quantity-production basis, the apparatus shown in the drawing may be replaced with a plant of suitable capacity. However, the fundamental process of the invention will be the same, independently of the scale on which it is carried out.

In operation, the inert gas such as carbon dioxide or nitrogen, carries the vapors of the organic acid or acid anhydride and of the arsenic trioxide, through the catalyst 6. As the vapors pass through the catalyst body, reactions take place which result in the formation of cacodyl oxide and/or cacodyl, or the homologues thereof, depending upon the particular organic acid or acid anhydride which is used. The products of the reaction are collected in the receiver 31.

As indicated, this invention is adapted to the semi-continuous catalytic production, with high yields, of cacodyl oxide and cacodyl, and the homologues or alkyl derivatives thereof. Although cacodyl and cacodyl oxide are now required in greater quantities than their homologues, such homologues as ethyl cacodyl and ethyl cacodyl oxide may also be made by the improved process.

The expression "cacodyl oxide and/or cacodyl" is used advisedly since these compounds may be formed in varying proportions. In some runs the product collected in the receiving flask 31 was found to be almost entirely cacodyl oxide, while in certain other runs, a fairly high percentage of cacodyl was also formed. Hence, the expression "cacodyl oxide and/or cacodyl," is intended to cover the product formed regardless of the specific composition thereof. By way of explanation, it is thought that the composition of the product, in respect to the diarsine and the oxide thereof, depends largely on the quantity of arsenic metal which is deposited on the catalyst during the course of the reaction; the arsenic acting as a reducing agent and tending toward the formation of the diarsine product.

It has been found that there may be considerable range in such factors as strength of the organic acid or acid anhydride used, temperature at which the catalyst body is maintained, type of catalyst, and rates at which the reactant vapors are conducted through the catalyst body.

In the preparation of cacodyl oxide and cacodyl from acetic acid, experience to date indicates that acetic acid from 50% strength to full strength may be used and satisfactory yields obtained. The presence of water vapor in the mixture being passed over the catalyst tends to slow down the rate of the reaction, but diminishes the rate of reduction of the arsenic trioxide by the acetic acid, the approximate maximum desired effect appearing to be obtained with acetic acid of about 75% strength.

Generally stated the catalyst may be an alkali metal salt or hydroxide which will react with the organic acid or acid anhydride to form the alkali metal salt thereof. Also an alkali metal salt of the organic acid may be used as a catalyst. It appears that the lower members of the alkali metal series of the periodic table such as cesium and potassium provide the best catalysts, whereas the upper members of the series, such as sodium and lithium do not serve as well. Specifically, cesium carbonate, potassium carbonate, cesium acetate and potassium acetate provide the better catalysts. However, satisfactory yields may be obtained with the corresponding sodium and lithium salts.

The catalysts should be supported upon some inert support of material such as pumice or asbestos string. The catalysts may be prepared by allowing the support such as pumice or asbestos string to stand for several hours in a concentrated solution of the particular catalytic compound to be used. After standing for the desired time, the excess solution may be decanted and the catalyst dried either by standing in the air or in a vacuum oven. It appears that a better catalyst is obtained when the drying thereof is carried out in a vacuum oven at about 100° C. Pumice of from No. 6 to No. 10 mesh has been used satisfactorily.

The catalysts have a long life and do not seem to deteriorate materially over long periods of reaction. When degenerated, the catalysts may be readily regenerated by discontinuing the reaction and "burning out" the catalyst by passing hot air therethrough at the reaction temperature.

When the catalyst used is a carbonate, experience has indicated that it is advisable to first partially convert this compound to the acetate before passing the vapors or arsenic trioxide therethrough. If the reactant vapors are passed through before a preliminary conversion to the acetate, the sudden evolution of carbon dioxide from the carbonate catalysts will cause some of the arsenic trioxide and acid vapor to pass through unchanged during the early stages of the reaction.

Many tests have been carried out to determine the optimum temperature at which the catalyst body should be maintained. It has been found that satisfactory yields may be obtained when the temperature of the catalyst is within the range of 300° C. to 450° C. However, generally speaking, from 300° C. to 400° C. appears to be the better range of temperature, and a temperature of around 350° C. seems to be the most satisfactory. These temperatures were measured on the outside of the tube 5 of the apparatus shown in the drawing.

The rate at which the reactant vapors should be passed through the catalyst is related to some extent to the temperature thereof. That is, if the reactants are passed through at a slow rate when the catalyst body is at an elevated temperature of around 400° C. or above, the yield is considerably diminished by the decomposition of the product into metallic arsenic and hydrocarbons. At these elevated temperatures, increases in the rate at which the reactants are supplied give increased yields, probably due to the cooling effect of the reactant vapors upon the catalyst body. At temperatures below approximately 375° C. the rate at which the reactants are supplied, as long as it is slow enough to allow complete reaction of the arsenic trioxide, appears to have little influence upon the yields.

The proportion in which the reactant vapors are used has been found to have little effect upon the yield so long as an excess of the organic acid or anhydride is employed. In the case of acetic acid, usually 10 moles of acetic acid were used per mole of arsenic trioxide, the theoretical amount of acid required being 4 moles. When acetic acid of 75% strength is used, satisfactory yields have been obtained when the reactant vapors are in the proportion of from 3 to 11 parts by weight of acetic acid to one part by weight of arsenic trioxide.

Cacodyl oxide and cacodyl have been prepared in the preferred embodiment of this invention by passing acetic acid over potassium pyro arsenite, $K_4As_2O_5$, at a temperature of 400° C. On converting the product obtained to cacodyl chloride, an over-all yield of 44% cacodyl chloride was obtained. On heating, the potassium pyro arsenite decomposes into arsenic trioxide and potassium oxide. The potassium oxide will react with the acetic acid, to form the acetate and hence this reaction is in accordance with the general reaction of the invention, which comprises passing the vapors of an organic acid or anhydride and the vapors of arsenic trioxide over a catalyst such as an alkali metal salt or hydroxide.

It has been found that cacodyl oxide and cacodyl may be made according to the catalytic process of the invention from acetic anhydride and arsenic trioxide. However, at the present time, the yields with acetic anhydride have not been as high as when acetic acid was used.

The highest yield obtained to date was 77% of cacodyl chloride on the basis of arsenic trioxide, using cesium carbonate as the catalyst. The factors of the run producing this maximum yield were a 75% strength acetic acid, a catalyst temperature of about 325° C., and the reactant vapors were in the proportion of about 5 parts by weight of acetic acid to one part by weight of arsenic trioxide. Upon further development of the invention, it is thought that even higher yields may be obtained.

By substituting propionic acid for acetic acid, arsenic trioxide may be converted into ethyl cacodyl oxide and ethyl cacodyl with high yields. The same apparatus and procedure can be used as that described above and shown in the drawing for making cacodyl oxide and cacodyl. The same type of catalysts may be used and the temperature range to which the catalysts should be heated appear to be substantially the same. A very good yield of ethyl cacodyl and ethyl cacodyl oxide was obtained when 75% propionic acid and arsenic trioxide vapor were passed over a catalyst comprising potassium carbonate impregnated upon pumice and which was heated to 350° C.

It will be understood that certain changes and modifications may be made, both in the substances used in the process and in the manner of carrying out the process, without departing from the scope and spirit of the invention. Furthermore, it will be apparent to those skilled in the art, that other materials having the characteristics of the materials set forth in connection with the fundamental process disclosed in the present application may be used without departing from the invention.

Accordingly, it is intended that this invention be limited in scope only as set forth in the appended claims.

We claim as our invention:

1. A method of making cacodyl oxide and cacodyl and homologues thereof which comprises reacting the vapors of an organic acid selected from the group consisting of acetic and propionic acids corresponding to the desired alkyl group to be attached to the arsenic and vapors of arsenic trioxide in the presence of a catalyst selected from the group consisting of the carbonates and hydroxides of cesium, potassium, lithium and sodium which will react with the organic acid to form the alkali metal salt thereof, while maintaining the catalyst at a temperature within the range of from 300° C. to 450° C.

2. A method of making cacodyl oxide and cacodyl and homologues thereof which comprises reacting the vapors of an organic acid selected from the group consisting of acetic and propionic acids corresponding to the desired alkyl group to be attached to the arsenic and the vapors of arsenic trioxide in the presence of potassium carbonate as a catalyst while maintaining the catalyst at a temperature within the range of 300° C. to 450° C.

3. A method of making cacodyl oxide and cacodyl and homologues thereof which comprises reacting the vapors of an organic acid selected from the group consisting of acetic and propionic acids corresponding to the desired alkyl group to be attached to the arsenic and the vapors of arsenic trioxide in the presence of cesium carbonate as a catalyst while maintaining the catalyst at a temperature within the range of 300° C. and 450° C.

4. A process of making cacodyl oxide and cacodyl which comprises reacting the vapors of acetic acid with the vapors of arsenic trioxide in the presence of a catalyst selected from the group consisting of the carbonates and hydroxides of cesium, potassium, lithium and sodium which will react with the acetic acid to form the alkali metal salt thereof while maintaining the catalyst at a temperature within the range of 300° C. to 450° C.

5. A process of making cacodyl oxide and cacodyl which is semi-continuous and adapted to give high yields comprising passing the vapors of acetic acid and arsenic trioxide over potassium carbonate as a catalyst and maintaining the catalyst at a temperature within the range of 300° C. to 400° C.

6. A process of making cacodyl oxide and cacodyl which is semi-continuous and adapted to give high yields comprising passing the vapors of acetic acid and arsenic trioxide over cesium carbonate as a catalyst and maintaining the catalyst at a temperature within the range of 300° C. to 400° C.

7. A process of making cacodyl oxide and cacodyl which is semi-continuous and adapted to give high yields comprising passing, by means of a current of inert carrying gas, the vapors of about 75% aqueous acetic acid and of arsenic trioxide in the ratio of one part by weight of arsenic trioxide to from about 3 to 11 parts by weight of the acetic acid over potassium carbonate as a catalyst and maintaining the catalyst at a temperature of about 350° C.

8. A process of making cacodyl oxide and cacodyl which is semi-continuous and adapted to give high yields comprising passing by means of a current of inert carrying gas, the vapors of about 75% aqueous acetic acid and of arsenic trioxide in the ratio of one part by weight of arsenic trioxide to from about 3 to 11 parts by weight of the acetic acid over cesium carbonate as a catalyst and maintaining the catalyst at a temperature of about 350° C.

9. A process of making ethyl cacodyl oxide and ethyl cacodyl which is semi-continuous and adapted to give high yields comprising reacting the vapors of propionic acid with the vapors of arsenic trioxide in the presence of a catalyst selected from the group consisting of the carbonates and hydroxides of cesium, potassium, lithium and sodium which will react with the propionic acid to form the alkali metal salt thereof while maintaining the catalyst at a temperature within the range of 300° to 400° C.

10. A process of making ethyl cacodyl oxide and ethyl cacodyl which is semi-continuous and adapted to give high yields comprising passing the vapors of propionic acid and arsenic trioxide over potassium carbonate as a catalyst and maintaining the catalyst at a temperature within the range of 300° C. to 400° C.

11. A process of making ethyl cacodyl oxide and ethyl cacodyl which is semi-continuous and adapted to give high yields comprising passing the vapors of propionic acid and arsenic trioxide over cesium carbonate as a catalyst and maintaining the catalyst at a temperature within the range of 300° C. to 400° C.

12. A process of making ethyl cacodyl oxide and ethyl cacodyl which is semi-continuous and adapted to give high yields comprising passing vaporized 75% aqueous propionic acid and sublimed arsenic trioxide over potassium carbonate as a catalyst and maintaining the catalyst at a temperature of about 350° C.

13. A process of making ethyl cacodyl oxide and ethyl cacodyl which is semi-continuous and adapted to give high yields comprising passing vaporized 75% aqueous propionic acid and sublimed arsenic trioxide over cesium carbonate as a catalyst and maintaining the catalyst at a temperature of about 350° C.

References Cited in the file of this patent

UNITED STATES PATENTS 1,521,560    Oechslin _____ Dec. 30, 1924

OTHER REFERENCES

"Organic Compounds of Arsenic and Antimony," Morgan (1918), pp. 5 to 13. (Copy Div. 6.)